United States Patent
Ishida et al.

(10) Patent No.: US 7,195,717 B2
(45) Date of Patent: Mar. 27, 2007

(54) FERRITE CORE FOR RFID APPLICATION, METHOD OF MANUFACTURING THE SAME, AND FERRITE COIL USING THE SAME

(75) Inventors: Chisato Ishida, Kokubu (JP); Masayuki Moriyama, Kokubu (JP); Hidehiro Takenoshita, Kokubu (JP)

(73) Assignee: Kyocera Corporation, Kyoto (JP)

( * ) Notice: Subject to any disclaimer, the term of this patent is extended or adjusted under 35 U.S.C. 154(b) by 260 days.

(21) Appl. No.: 10/900,508

(22) Filed: Jul. 27, 2004

(65) Prior Publication Data

US 2005/0023501 A1   Feb. 3, 2005

(30) Foreign Application Priority Data

Jul. 28, 2003   (JP)   .............................. 2003-202740

(51) Int. Cl.
*B22C 9/10*   (2006.01)
(52) U.S. Cl. ............... 252/62.62; 252/62.6; 252/62.59; 310/216; 264/612
(58) Field of Classification Search ............... 310/216; 264/612; 252/62.62, 62.6, 62.59
See application file for complete search history.

(56) References Cited

FOREIGN PATENT DOCUMENTS

| | | |
|---|---|---|
| JP | 02-162222 | 6/1990 |
| JP | 02-263137 | 10/1990 |
| JP | 03-028007 | 2/1991 |
| JP | 03-292207 | 12/1991 |
| JP | 08-310855 | 11/1996 |
| JP | 08-310856 | 11/1996 |
| JP | 09-309305 | 12/1997 |
| JP | 2001-015322 | 1/2001 |
| JP | 2001-093718 | 4/2001 |
| JP | 2001-308629 | 11/2001 |
| JP | 2002-179460 | 6/2002 |
| JP | 2002-264617 | 9/2002 |
| JP | 2002-343621 | 11/2002 |

OTHER PUBLICATIONS

Translation of JP 2002-179460.*

* cited by examiner

*Primary Examiner*—C. Melissa Koslow
(74) *Attorney, Agent, or Firm*—Hogan & Hartson LLP (57) ABSTRACT

A ferrite core comprising a sintered oxide containing at least 48.6 to 53.9 mol % of Fe on $Fe_2O_3$ basis, 12.3 to 35.2 mol % of Ni on NiO basis and 16.4 to 37.0 mol % of Zn on ZnO basis as metal elements, and contains a crystal phase comprising two or more kinds of solid solutions selected from $NiFe_2O_4$, $ZnFe_2O_4$ and $FeFe_2O_4$, wherein full width at half maximum of a diffraction peak, of crystal phase of which diffraction angle $2\theta$ is in a range from 34.6 to 36.4° as measured by X-ray diffraction analysis using Cu—K$\alpha$ beam, is 0.4° or less.

19 Claims, 4 Drawing Sheets

FERRITE CORE FOR RFID APPLICATION, METHOD OF MANUFACTURING THE SAME, AND FERRITE COIL USING THE SAME

Priority is claimed to Japanese Patent Application No. 2003-202740 filed on Jul. 28, 2003, the disclosure of which is incorporated by reference in its entirety.

BACKGROUND OF THE INVENTION

1. Field of the Invention

The present invention relates to a ferrite core for RFID (Radio Frequency Identification) application, a method of manufacturing the same and a ferrite coil that uses the same, and particularly to a ferrite core for RFID application that can be preferably applied to a device for detecting the air pressure or temperature of a vehicle tire, a vehicle theft preventing device, keyless entry system of a vehicle or the like, a method of manufacturing the same and a ferrite coil that uses the same.

2. Description of Related Art

Sintered ferrite has been used widely in various electronics apparatuses as the magnetic core of ferrite coil, transformer, magnetic head or the like. For example, such a sintered ferrite has been disclosed in Patent Document 1 containing at least one element selected from Mg, Ni, Cu, Mn and Li and has carbon content less than 96 ppm.

Patent Document 2 discloses a sintered ferrite containing 46 to 52 mol % of $Fe_2O_3$, 28 to 36 mol % of NiO and 16 to 22 mol % of ZnO as major components, wherein the proportion of crystal grains having sizes in a range from 0.2D to 3D is 50% by volume or more, D being the mean crystal grain size.

Further, Patent Documents 3 to 5 disclose a Ni—Zn-based sintered ferrite containing 48.0 to 50.0 mol % of $Fe_2O_3$, 14.0 to 24.0 mol % of NiO and 28.0 to 36.0 mol % of ZnO wherein mean crystal grain size is in a range from 3 to 30 μm and number of crystal grains having sizes exceeding twice the mean crystal grain size is within 10% of the total number of crystal grains.

Further, Patent Document 6 discloses a low-loss oxide magnetic material made of Ni—Zn—Cu ferrite containing $Fe_2O_3$, NiO, ZnO and CuO as main components wherein $D_{50}$ in the crystal grain size distribution of the sintered body is from 8 to 31 μm, $D_{10}$ is 3 μm or larger, and $D_{90}$ is 50 μm or smaller.

Notification of the air pressure or temperature of a vehicle tire to the driver by means of RFID is carried out as follows. The tire is provided with a sensor that measures the air pressure or temperature of the tire by means of induced electromotive force of a ferrite coil generated by weak electromagnetic wave transmitted to the ferrite coil that comprises a magnetic material such as sintered ferrite and a coil wound thereon. When an electrical signal is transmitted to the sensor directing it to measure the pressure or temperature, the sensor measures the pressure or temperature in the tire and sends the measured data to the driver. Such technologies that employ the RFID are disclosed in Patent Documents 7 to 12.

The Patent Documents include such technologies related to a configuration of setting an RFID tag that uses ferrite magnetic material (Patent Document 7), a method for detecting air pressure in a tire using a magnetic material that is movable in a tire (Patent Document 8), an antenna for tire monitoring apparatus that uses a magnetic circuit based on ferrite magnet (Patent Document 9), a tire inner condition monitoring apparatus that generates an electromotive force in a coil comprising a magnetic material as the core and detects abnormal rotation of the tire (Patent Document 10), a configuration of mounting a tire pressure detecting apparatus that uses a ferrite coil (Patent Document 11) and a low tire pressure warning apparatus that uses a magnet coil (Patent Document 12).

Further, Patent Document 13 proposes a loop antenna apparatus that allows for keyless entry to a vehicle (non-contact locking and unlocking of vehicle doors) by making use of induced electromotive force generated in a ferrite core for RFID application comprising a Ni—Zn-based ferrite core with an electrically conductive wire wound thereon.

However, it is difficult to measure the air pressure or temperature in the tire by using the sintered ferrite disclosed in Patent Documents 1 to 6 as the ferrite or magnetic material used in the RFID technology disclosed in Patent Documents 7 to 13. This is because a sufficient level of induced electromotive force cannot be generated in the ferrite coil that uses the sintered ferrite disclosed in Patent Documents 1 to 6, and therefore a sufficient signal directing the pressure sensor or the temperature sensor to measure the pressure or temperature in the tire is not transmitted to a pressure sensor or a temperature sensor. When the sintered ferrite disclosed in Patent Documents 1 to 6 is used to make the ferrite coil of the loop antenna apparatus of Patent Document 13, it is difficult to lock and unlock the vehicle door. Difficulty in measuring the air pressure or temperature in the tire or in locking and unlocking the door is caused because sufficient induced electromotive force is not generated in the ferrite coil made of the sintered ferrite of Patent Documents 1 to 6. Thus there has been a demand for ferrite core for RFID application that can generate a sufficient level of induced electromotive force. The ferrite core for RFID application is also required to have high mechanical strength that does not vary significantly, in order to improve the safety of vehicles. But the conventional sintered ferrite materials do not satisfy these requirements.

A ferrite coil made of the sintered ferrite of Patent Documents 1 to 6 may have low sensitivity per one winding that is determined by dividing the induced electromotive force, generated in the ferrite coil when a magnetic field is applied thereto, by the intensity of the applied magnetic field, thus giving rise to such a problem that the sintered ferrite core used for the ferrite coil must be made larger and the number of windings must be increased, resulting in difficulty to make the ferrite coil smaller. There has also been such a problem that making the ferrite coil smaller leads to lower level of induced electromotive force.

Causes of the decrease in the mechanical strength and the decrease in the induced electromotive force are as follows. In order to obtain a ferrite coil having high and stable levels of induced electromotive force and sensitivity, it is necessary to use a ferrite core that has low core loss, high magnetic permeability that does not vary significantly and high Curie temperature. To make a ferrite core having low core loss, it is necessary to order the crystalline structure of the crystal phase of spinel type (one or more kinds of solid solutions selected from $NiFe_2O_4$, $ZnFe_2O_4$ and $FeFe_2O_4$) contained in the ferrite core. By ordering the crystalline structure, it is made possible to make a ferrite core that has lower core loss, higher and more stable magnetic permeability and higher Curie temperature from the material of the same chemical composition (for example, contents of Fe, Ni and Zn). Crystalline structure of the ferrite core made of the conventional sintered ferrite is sometimes poorly ordered, thus resulting in large core loss, low magnetic permeability and low Curie temperature. In such a case, the ferrite core for RFID application that uses the ferrite core made of the conventional sintered ferrite has insufficient level of induced electromotive force.

Moreover, making a sintered ferrite having high mechanical strength requires it to order the crystalline structure of spinel type crystal phase so as to decrease the internal stress and control the variations in the crystal grain size within a certain range. It is made possible to make a sintered ferrite that has higher and more stable magnetic permeability and mechanical strength from the material of the same composition (for example, contents of Fe, Ni and Zn) by such control.

However, with the conventional sintered ferrite that has such trouble as the crystalline structure is poorly ordered and/or the crystal grain size is not controlled, it has not been possible to achieve sufficiently high mechanical strength on stable basis.

Moreover, since tires may be exposed to intense mechanical vibrations at high temperatures, the sintered ferrite that constitutes the ferrite core for RFID application is required to have not only low core loss, high Curie temperature and high magnetic permeability, but also small relative temperature coefficient of magnetic permeability in absolute value and highly dense structure, depending on the application. Moreover, in case the ferrite core provided with an electrically conductive wide wound thereon is molded with a resin, it has been required to decrease the changes in inductance in the presence of compressive stress, since the molding process generates the compressive stress in the ferrite core. The sintered ferrite that constitutes the ferrite core disclosed in the prior art cannot satisfy these requirements.

The sintered ferrite of Patent Document 1 has crystal grain size distribution that is not controlled, although it is claimed that the mechanical strength can be improved by controlling the carbon content to less than 96 ppm. While it is described that mean crystal grain size is preferably controlled within a range from 1 to 30 µm, there is a possibility that magnetic permeability and/or Curie temperature become lower when the crystal grain size distribution varies. Further, since there is no description about carefully crushing the calcined material, unsatisfactory characteristics sometimes result such as large core loss, low magnetic permeability, low Curie temperature and/or low mechanical strength, in case the particle sizes of the calcined powder are larger which leads to insufficiently ordered crystalline structure of the sintered body.

Patent Document 2 specifies the crystal grain size distribution of the ferrite material, but a large core loss sometimes results because the particle sizes of the powder are larger before calcination which leads to larger size of crushed powder after calcination and to crystalline structure that is not ordered.

The sintered ferrite of Patent Documents 3 to 5 has crystal grain sizes uniformly controlled, although the particle sizes of the powder before calcination and the particle sizes of crushed powder after calcination are not controlled. As a result, the crystalline structure of the sintered body is not sufficiently ordered, thus resulting in large core loss, low magnetic permeability, low Curie temperature and/or low mechanical strength.

Patent Document 6 discloses a low-loss oxide magnetic material made of sintered ferrite that has power loss (core loss) of the sintered ferrite decreased by defining the calcination (preliminary firing) temperature and the particle size of the calcined powder. However, larger core loss sometimes results due to the following causes. In case particle sizes of the powder before calcination are large in the process of manufacturing the sintered ferrite, it may become impossible to sufficiently synthesize the calcined powder, namely a powder that has spinel structure and consists of crystal grains having sufficiently ordered crystalline structure. Cause of insufficient synthesis is that powders of $Fe_2O_3$, NiO, ZnO and CuO do not react sufficiently in the calcination process, thus resulting in insufficient growth of the crystal grains of spinel structure, and therefore much of the powders of $Fe_2O_3$, NiO, ZnO and CuO remain in the state of calcined powder without reacting. When the calcined powder containing much non-reacted powder is sintered, crystalline structure of the crystal phase having spinel structure cannot be ordered enough during the sintering process. Therefore, when particle sizes of the powder before calcination are large, much crystal of which structure is not sufficiently ordered remains in the sintered body, thus resulting in large core loss. Even when the calcined powder is synthesized sufficiently, insufficient crushing of the calcined powder results in large particles contained in the powder before calcination, and therefore crystalline structure of the sintered body is not sufficiently ordered and core loss becomes larger. When calcined, the powders of $Fe_2O_3$, NiO, ZnO and CuO react with each other so as to generate crystal grains having spinel structure. However, it is supposed that the crystal grains that constitute the calcined powder do not have exactly the same composition. Slight differences in the lattice constant between the crystal grains in the sintered body suggest that the crystal grains that constitute the calcined powder have different compositions according to variations in the compositions. The greater the variations in the composition, the more the lattice defects generated in the crystal of spinel structure, resulting in irregular crystalline structure. Suppressing the occurrence of such lattice defects contributes to the ordering of crystalline structure in the crystal phase of spinel structure. This is because insufficient crushing of calcined powder causes the composition of the crystal grains contained in the sintered body to vary, and sintering of the material having the varying compositions not corrected leads to variations in the composition of the crystal grains contained in the sintered body, thus resulting in the sintered body having crystalline structure that is not ordered enough. Thus the low-loss oxide magnetic material of Patent Document 6 sometimes has large core loss.

As described above, since the sintered ferrite or the ferrite material of Patent Documents 1 to 6 does not have low core loss, high magnetic permeability and/or high Curie temperature, the ferrite coil made from such sintered ferrite or the ferrite material has a problem of low induced electromotive force generated by each winding when subjected to a magnetic field.

Thus it is difficult to apply the ferrite coil made from the sintered ferrite or the ferrite material of Patent Documents 1 to 6 to ferrite core for RFID application that is required to have large induced electromotive force, high sensitivity and good mechanical properties.

In any of the magnetic material used in the configuration of setting RFID described in Patent Document 7, the magnetic material used in the detection method disclosed in Patent Document 8, the ferrite magnet used in the antenna described in Patent Document 9, the magnetic material used in the monitoring apparatus of Patent Document 10, the ferrite magnet used in the configuration of Patent Document 11, the magnetic material used in the pressure warning apparatus of Patent Document 12 and the Ni—Zn-based ferrite magnet used for the antenna of Patent Document 13, there is no description about controlling the composition of the magnetic core, crystal grain size distribution and the crystalline structure, and therefore there has been such problems as large core loss, high magnetic permeability and/or low Curie temperature. Thus it has been difficult to apply these materials to ferrite core for RFID application.
Patent Document 1: Japanese Unexamined Patent Publication (Kokai) No. 2001-93718
Patent Document 2: Japanese Unexamined Patent Publication (Kokai) No. 2002-179460
Patent Document 3: Japanese Unexamined Patent Publication (Kokai) No. 2001-15322
Patent Document 4: Japanese Unexamined Patent Publication (Kokai) No. 8-310856
Patent Document 5: Japanese Unexamined Patent Publication (Kokai) No. 8-310855
Patent Document 6: Japanese Unexamined Patent Publication (Kokai) No. 2002-343621
Patent Document 7: Japanese Unexamined Patent Publication (Kokai) No. 2002-264617
Patent Document 8: Japanese Unexamined Patent Publication (Kokai) No. 3-28007
Patent Document 9: Japanese Unexamined Patent Publication (Kokai) No. 2-263137
Patent Document 10: Japanese Unexamined Patent Publication (Kokai) No. 3-292207
Patent Document 11: Japanese Unexamined Patent Publication (Kokai) No. 9-309305
Patent Document 12: Japanese Unexamined Patent Publication (Kokai) No. 2-162222
Patent Document 13: Japanese Unexamined Patent Publication (Kokai) No. 2001-308629

SUMMARY OF THE INVENTION

An advantage of the present invention is to provide a ferrite core for RFID application that has low core loss, high magnetic permeability with less variability and high Curie temperature, and a method of manufacturing the same.

Another advantage of the present invention is to provide a ferrite coil that uses the ferrite core for RFID application and has high induced electromotive force and high sensitivity.

The ferrite core for RFID application of the present invention comprises a sintered oxide containing 48.6 to 53.9 mol % of Fe on $Fe_2O_3$ basis, 12.3 to 35.2 mol % of Ni on NiO basis and 16.4 to 37.0 mol % of Zn on ZnO basis as metallic components, and contains a crystal phase comprising two or more kinds of solid solutions selected from $NiFe_2O_4$, $ZnFe_2O_4$ and $FeFe_2O_4$, wherein full width at half maximum (hereafter, referred to as "FWHM") of the diffraction peak of the crystal phase at diffraction angle $2\theta$ in a range from 34.6 to 36.4° as measured by X-ray diffraction analysis using Cu—K$\alpha$ beam, is 0.4° or less. Since such a constitution enables it to order the crystalline structure, and therefore a ferrite core of smaller core loss can be made.

The ferrite core for RFID application of the present invention shows low and stable core loss, high and stable magnetic permeability and high Curie temperature, when a mean crystal grain size is in a range from 2 to 15 µm and the number of crystal grains having sizes in a range from 0.5D to 3D is 60% or more of the total number of crystal grains.

The ferrite core for RFID application of the present invention preferably contains 9 parts by weight or less of Cu on CuO basis for 100 parts by weight of the sintered oxide. This constitution enables it to maintain the surface electrical resistivity at a high level and therefore can make a ferrite core of smaller core loss. Since Cu also has an effect of suppressing the growth of crystal grains, proportion of the crystal grains having sizes in a range from 0.5D to 3D can be increased to 95% or more by containing 9 parts by weight or less of Cu on CuO basis, so that variations in the magnetic permeability can be decreased further.

When the ferrite core for RFID application contains Cu, it is preferable that 0.001 to 0.6 parts by weight of Zr on $ZrO_2$ basis is contained for 100 parts by weight of the sintered oxide, Zr is uniformly distributed in the sintered oxide and thickness of the grain boundary phase in the sintered oxide is 20 nm or less. This constitution improves the mechanical strength, makes it easier for magnetic walls to migrate and makes it less sensitive to antimagnetism, thereby reducing the core loss further.

Also in the ferrite core for RFID application of the present invention, it is preferable that the difference between the mean crystal grain size in the surface of the sintered oxide and the mean crystal grain size in the inside is 10 µm or less. This feature reduces the internal stress and therefore increases the mechanical strength.

The ferrite core for RFID application of the present invention has a high induced electromotive force and high sensitivity when the magnetic permeability is 400 or higher. When relative temperature coefficient of the magnetic permeability in a range from −50 to 150° C. is from $-2\times10^{-6}$ to $2\times10^{-6}/°$ C., a ferrite core that maintains high induced electromotive force and stable sensitivity when the temperature changes in this range can be made. Moreover, when the density is 5.0 g/cm$^3$ or higher, high mechanical strength and high induced electromotive force can be achieved.

When the ferrite core for RFID application of the present invention has strength of 140 MPa or higher as measured by 3-point bending test, a ferrite coil made by winding an electrically conductive wire around the ferrite core and is installed in a vehicle tire would not be broken when subjected to mechanical vibration so that high mechanical reliability can be achieved. If changes in inductance under compressive pressure of 50 MPa per 1 mm$^2$ are within ±10%, variations in the induced electromotive force can be reduced when a ferrite coil made by winding an electrically conductive wire around the ferrite core and is molded with a resin is subjected to a magnetic field. In addition, mechanical reliability can be improved when the fracture toughness measured by IF method is 0.8 MPa·m$^{1/2}$ or higher.

The method of manufacturing the ferrite core for RFID application according to the present invention comprises a primary crushing step of making a primary crushed powder having a specific surface area exceeding 5 m$^2$/g by mixing and crushing a powder containing a powder of at least a powder of Fe oxide, a powder of Ni oxide and a powder of Zn oxide and containing 48.6 to 53.9 mol % of the Fe oxide on $Fe_2O_3$ basis, 12.3 to 35.2 mol % of the Ni oxide on NiO basis and 16.4 to 37.0 mol % of the Zn oxide on ZnO basis as major components, and at least one of the Fe oxide, the Ni oxide and the Zn oxide has specific surface area exceeding 5 m$^2$/g; a calcination step of calcinating the primary crushed powder so as to make calcined powder; a secondary crushing step of crushing the calcined powder to make secondary crushed powder having a specific surface area exceeding 5 m$^2$/g; a forming step of forming a green body (precursor of ferrite core for RFID application) by mixing the secondary crushed powder and an organic binder, granulating the mixture and molding the granulated material; a debinding step of removing the organic binder from the green body to make a debound green body having carbon content of 300 ppm or less; and a firing step of firing the debound green body in a firing furnace at a temperature from 1050 to 1300° C. to make the ferrite core for RFID application made of a sintered body. Since this feature prevents carbon that is contained in the debound green body from reacting with oxygen and generating lattice defects such as oxygen defects during firing, mechanical strength can be increased and the carbon content can be reduced in the sintered body, therefore surface resistivity of the sintered body can be increased and core loss can be improved.

The ferrite coil of the present invention comprises the ferrite core for RFID application described above and an electrically conductive wire wound around the ferrite core, and is characterized in that the sensitivity per one winding, that is determined by dividing the induced electromotive force, generated in the ferrite coil when a magnetic field is applied thereto, by the intensity of the applied magnetic field, further divided by the cross sectional area of the ferrite core in the portion whereon the electrically conductive wire is wound is 1 mV/(μT·mm$^2$) or higher. This ferrite core for RFID application, due to low and stable core loss, high and less variable magnetic permeability and high Curie temperature, can be used as the pressure sensor or temperature sensor of vehicle tire and is capable of normally activating a switch under the condition of vibration and load being applied thereto.

DESCRIPTION OF PREFERRED EMBODIMENTS

Now the present invention will be described in detail.

The ferrite core for RFID application of the present invention will be described.

Figure 1A:
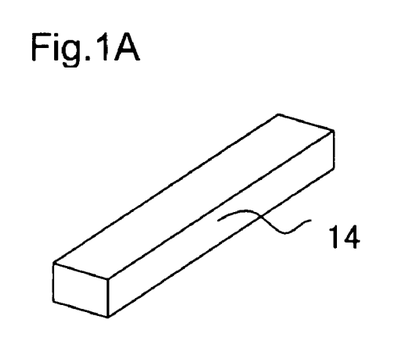
FIG. 1A to D are perspective views showing a ferrite core for RFID application according to the present invention.
Figure 1B:
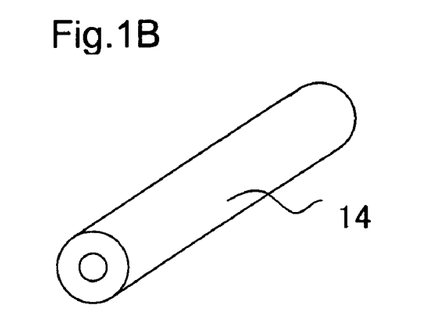
Figure 1C:
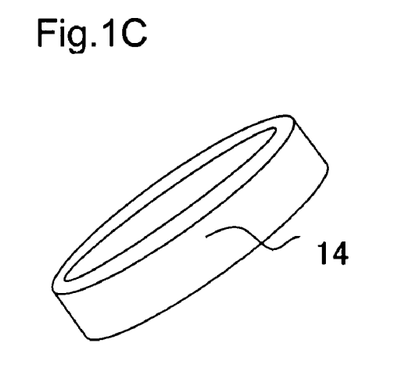
Figure 1D:
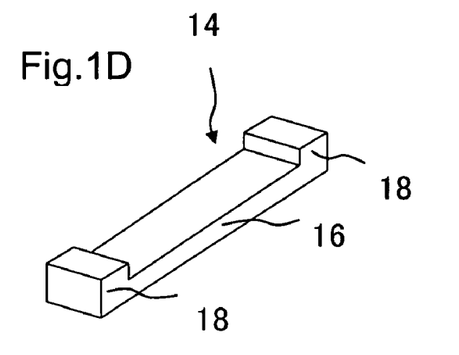

FIG. 1A to D are perspective views showing various embodiments of the ferrite core for RFID application according to the present invention. The ferrite core for RFID application 14 of the present invention comprises a core made of a sintered oxide in such a shape as prism, tube, ring or concave. FIG. 1A, for example, shows a prism configuration measuring 1 mm in height, 1.44 mm in width and 11 mm in length. FIG. 1B shows a tubular configuration measuring 2 mm in outer diameter, 1.47 mm in inner diameter and 11 mm in length. FIG. 1C shows a ring measuring 6.5 mm in outer diameter, 3 mm in inner diameter and 2.5 mm in thickness. FIG. 1D shows a piece comprising a stem 16 measuring 1 mm in height, 1.44 mm in width and 8 mm in length and end portions 18 each measuring 1.2 mm by 1.7 mm by 1.5 mm in length provided at either end of the stem 16, the stem 16 and the end portions 18 being sintered in a single piece.

The ferrite core for RFID application 14 of the present invention is made of sintered oxide containing at least 48.6 to 53.9 mol % of Fe on $Fe_2O_3$ basis, 12.3 to 35.2 mol % of Ni on NiO basis and 16.4 to 37.0 mol % of Zn on ZnO basis as metallic components, and consists of two or more kinds of solid solutions selected from $NiFe_2O_4$, $ZnFe_2O_4$ and $FeFe_2O_4$, wherein FWHM of the diffraction peak of the crystal phase with diffraction angle 2θ in a range from 34.6 to 36.4° as measured by X-ray diffraction analysis using Cu—Kα beam is 0.4° or less.

This constitution makes it possible to obtain a ferrite core for RFID application 14 having low and stable core loss, high and stable magnetic permeability and high Curie temperature.

One of the conditions for suppressing the core loss is to maintain a high value of electrical resistivity of the ferrite core for RFID application 14, particularly the surface resistivity. A ferrite core having surface resistivity of 100 MΩ or higher, magnetic permeability of 200 or higher and Curie temperature of 120° C. or higher can be made, by forming the ferrite core from sintered oxide containing at least Fe, Ni and Zn as metal elements and contains 48.6 to 53.9 mol % of Fe on $Fe_2O_3$ basis, 12.3 to 35.2 mol % of Ni on NiO basis and 16.4 to 37.0 mol % of Zn on ZnO basis. Proportions of Fe, Ni and Zn out of these ranges may make it impossible to achieve magnetic permeability of 200 or higher and Curie temperature of 120° C. or higher while maintaining surface resistivity of 100 MΩ or higher. More preferably, lower limit of Fe content is 49.7 mol % and upper limit is 51.9 mol % on $Fe_2O_3$ basis, lower limit of Ni content is 14 mol % and upper limit is 33 mol % on NiO basis and lower limit of Zn content is 18 mol % and upper limit is 35 mol % on ZnO basis.

Since crystalline structure can be ordered by including two or more kinds of solid solutions selected from $NiFe_2O_4$, $ZnFe_2O_4$ and $FeFe_2O_4$, controlling the FWHM of the diffraction peak of the crystal phase in diffraction angle 2θ in a range from 34.6 to 36.4° as measured by X-ray diffraction analysis using Cu—Kα beam to 0.4° or less, core loss can be made smaller, magnetic permeability can be made higher with variations thereof being suppressed.

Figure 2:
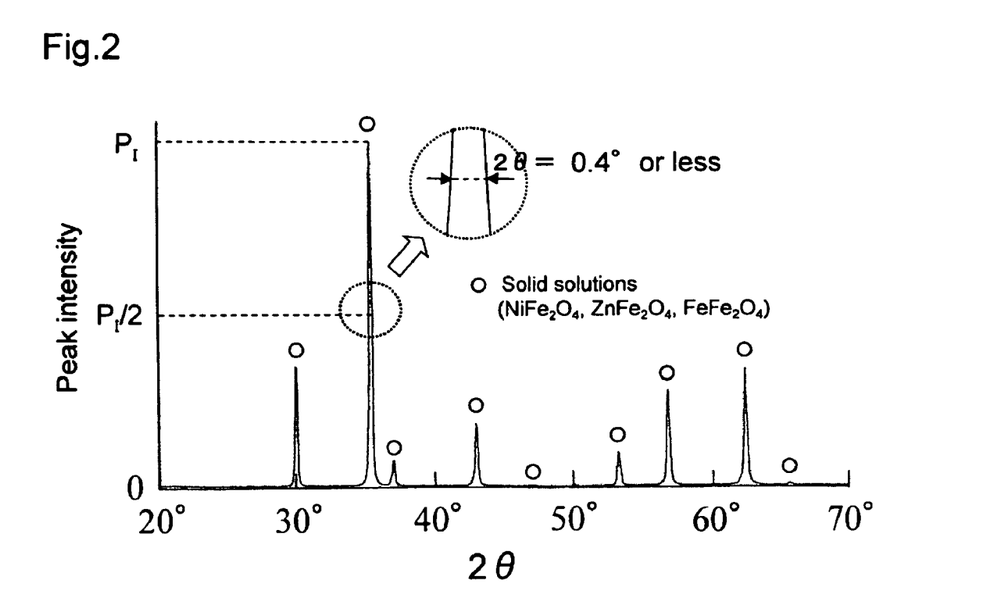
FIG. 2 is a diagram showing the X-ray diffraction pattern of the ferrite core for RFID application according to the present invention.

FIG. 2 shows an example of X-ray diffraction pattern observed by using Cu—Kα beam on the ferrite core for RFID application 14 of the present invention, which is made of a solid solution of $NiFe_2O_4$, $ZnFe_2O_4$ and $FeFe_2O_4$. Let the intensity of the highest peak (P) of the X-ray diffraction pattern, located at 2θ=34.6 to 36.4°, be $P_1$, and draw a line parallel to the horizontal axis of 2θ at the height of $P_1/2$. Then the distance between the points where the line crosses the peak (P) is the FWHM, which is set to 0.4° or less.

By setting the FWHM to 0.4° or less, surface resistivity can be made higher and core loss of the ferrite core for RFID application 14 can be made smaller. When the crystalline structure of the crystal having the spinel structure described previously is ordered, the FWHM decreases. Ordering the crystalline structure means that lattice defects decrease, the atoms that constitute the crystal lattice are arranged in order and the crystal lattice is arranged in order. The ferrite core for RFID application 14 having such a crystalline structure has higher surface resistivity and lower core loss. When induced electromotive force is generated by winding an electrically conductive wire around the ferrite core for RFID application 14 and applying a magnetic field to the ferrite core, loss of the applied magnetic field (electromagnetic energy) is made smaller and the induced electromotive force generated by the ferrite core can be increased by making the core loss of the ferrite core for RFID application 14 smaller. Means for decreasing the core loss is to increase the surface resistivity. Core loss can be decreased by increasing the surface resistivity, supposedly because higher surface resistivity leads to higher electrical insulation of the ferrite core for RFID application 14, and results in suppression of energy loss due to the conversion of electromagnetic energy generated by the increasing eddy current into heat and other forms of energy.

When there are many lattice defects in the crystal, on the other hand, many electrons and holes that are charge carriers are generated, and the electrons and holes constitute electric current, resulting in a decrease in the electrical resistance, particularly in surface resistivity. When the atoms that constitute the crystal lattice are not arranged in order, the crystal lattice cells cannot maintain electrical neutrality. In order to restore electrical neutrality, crystal lattice cells exchange electrons and holes between each other, and/or oxygen ions hop, resulting in a decrease in the electrical resistance, particularly in surface resistivity. Increasing lattice defects or disordering of the crystalline structure results in a decrease in the electrical resistance, particularly in surface resistivity, supposedly because the crystal lattice faces the free space on the surface of the ferrite core for RFID application 14 and therefore electromagnetic energy imparted to the surface makes it easier for the carriers to migrate in the surface.

The ferrite core for RFID application 14 of the present invention can be made by controlling the specific surface areas of the powder of starting material, the stock material powder before calcination and the calcined powder to be higher than 5 m$^2$/g, controlling the carbon content of debound green body to 300 ppm or less and sintering the green body at a temperature from 1050 to 1300° C., as will be described in more detail later.

More preferably, Fe content is from 49.7 to 51.9 mol % on Fe$_2$O$_3$ basis, Ni content is from 15 to 20 mol % on NiO basis and Zn content is from 30 to 35 mol % on ZnO basis, solid solution of NiFe$_2$O$_4$, ZnFe$_2$O$_4$ and FeFe$_2$O$_4$ is contained as the crystal phase, and the FWHM is 0.3° or less.

Concentrations of Fe, Zn and Ni can be measured by ICP emission spectrochemical analysis, and crystal phase can be identified by X-ray diffraction analysis using Cu—Kα beam. The FWHM can be measured by a process described below.

Surface of the ferrite core for RFID application 14 is observed by X-ray diffraction analysis using Cu—Kα beam. A diffraction peak having diffraction angle 2θ in a range from 34.6 to 36.4° obtained by the X-ray diffraction analysis can be regarded as the diffraction peak of crystal phase consisting of a solid solution of two or more kinds of NiFe$_2$O$_4$, ZnFe$_2$O$_4$ and FeFe$_2$O$_4$. More specifically, the diffraction peak of which FWHM is to be measured is regarded as a diffraction peak formed by superposition of at least two of (311) plane of ZnFe$_2$O$_4$ of JCPDS (Joint Committee on Powder Diffraction Standards) card No. 22-1012, (311) plane of FeFe$_2$O$_4$ of JCPDS card No. 19-629 and (311) plane of NiFe$_2$O$_4$ of JCPDS card No. 10-325. According to these cards, interplanar spacing of the diffraction peak of which FWHM is to be measured is about 2.51 to 2.54 Å, and the diffraction angle 2θ is in a range from 34.6 to 36.4° measured with Cu—Kα beam is around 35.2 to 35.6°. The FWHM can be determined by, as described previously, with the intensity of the highest peak (P) of the X-ray diffraction pattern located at 2θ=34.6 to 36.4°, denoted as P$_1$, drawing a line parallel to the horizontal axis of 2θ at the height of P$_1$/2 and measuring the distance between the points where the line crosses the peak (P) as the FWHM.

The reason for using the diffraction peak having diffraction angle 2θ in a range from 34.6 to 36.3° when determining the FWHM of the diffraction peak of the solid solution in the present invention is that the true diffraction angle (around 35.2 to 35.6°) of the solid solution and the measured diffraction angle of the solid solution may not be the same depending on the measurement error of the X-ray diffraction analyzer or other factor. Therefore, even when diffraction angle of the diffraction peak formed by superposition of at least two of (311) plane of ZnFe$_2$O$_4$, (311) plane of FeFe$_2$O$_4$ and (311) plane of NiFe$_2$O$_4$ is out of the range from 34.6 to 36.4°, if the FWHM of the peak is 0.4° or less, the ferrite core for RFID application 14 falls within the scope of the present invention. If this FWHM is 0.4° or less, this ferrite core is contained in the range of this invention.

In order to make a ferrite core for RFID application that has low core loss, high magnetic permeability with less variability and high Curie temperature, it is preferable that mean crystal grain size is D in a range from 1 to 30 μm and the number of crystal grains having sizes in a range from 0.5D to 3D is 60% or more of the total number of crystal grains It is more preferable that mean crystal grain size is in a range from 2 to 15 μm and the number of crystal grains having sizes in a range from 0.5D to 3D is 60% or more of the total number of crystal grains. This constitution makes it possible to decrease the core loss further while maintaining the magnetic permeability to 200 or higher and the Curie temperature at 120° C. or higher, and reduce the variations in the magnetic permeability, and therefore the induced electromotive force and sensitivity can be improved when a magnetic field is applied to the ferrite coil 30 made by winding an electrically conductive wire around the ferrite core for RFID application 14. This means that one of the conditions for decreasing the core loss further is to make it easier for the magnetic walls to move. Since crystal boundaries hamper the movement of magnetic walls, core loss increases as the number of crystal boundaries increases. Even when the mean crystal grain size is the same, variations in the magnetic permeability increase when variations in crystal grain size increase. If the mean crystal grain size is less than 2 μm, the area of grain boundary increases, making it difficult for the magnetic walls to move, and it may become impossible to reduce the core loss further.

If the mean crystal grain size is more than 15 μm, since grains which grew unusually gene increases and a hysteresis loss increases, it may become impossible to reduce the core loss further. The proportion of the crystal grains having sizes in a range from 0.5D to 3D of the total number of crystal grains is less than 60%, since the grains which grew unusually is formed locally, the area of a crystal grain boundary increases and variations of the crystal grain size increases, it may become impossible to reduce the core loss further and to reduce variations in the magnetic permeability. It is more preferable that lower limit of the mean crystal grain size is 3 μm and upper limit is 9 μm and the proportion described above is 85% or higher, which makes it become possible to reduce the core loss further and decrease variations in the magnetic permeability further. It is further more preferable to set the proportion to 92% or higher, which makes it possible to decrease variations in the magnetic permeability further.

The method of manufacturing the ferrite core for RFID application 14 while controlling the crystal grain sizes in the range described above will be described later.

Crystal grain size of the ferrite core for RFID application 14 is measured, for example, as follows. Surface of the ferrite core for RFID application 14 is observed with a scanning electron microscope and a crystallogram is taken on which incircle and circumcircle are drawn for each crystal grain, and the average of the incircle and the circumcircle is taken as the size of the crystal grain. All crystal grain sizes are averaged to give the mean crystal grain size and proportion of the crystal grains having sizes in a range from 0.5D to 3D to the total number of crystal grains is determined. When the grain boundaries are blurred and crystal grain size cannot be accurately measured, grain boundary phase may be removed from the surface by chemical etching or heat treatment before measuring the crystal grain size. In the measurement of crystal grain size, crystal grains not larger than 0.2 μm are omitted from the calculation of the crystal grain size, since these small grains do not have significant influence on the magnetic permeability and are difficult to measure.

The ferrite core for RFID application 14 of the present invention preferably contains up to 9 parts by weight of Cu on CuO basis for 100 parts by weight of the sintered oxide. As CuO is contained, Cu further dissolves into the solid solution described previously so as to form a crystal phase that is more electrically stable, thereby making it possible to increase the surface resistivity and reduce the core loss. Also because Cu has an effect of suppressing the growth of crystal grains, inclusion of 9 parts by weight or less Cu on CuO basis increases the proportion of crystal grains having sizes in a range from 0.5D to 3D to 95% or higher, so that variations in the magnetic permeability can be reduced further. It is not desirable to contain more than 9 parts by weight Cu on CuO basis, since significant improvement in the surface resistivity of the ferrite core for RFID application 14 cannot be achieved in such a case, It is particularly preferable that Cu content on CuO basis is within a range from a lower limit of 3.7 parts by weight and an upper limit of 7.9 parts by weight.

When the ferrite core for RFID application 14 contains up to 9 parts by weight of Cu on CuO basis for 100 parts by weight of the sintered oxide, it is preferable that 0.001 to 0.6 parts by weight of Zr on $ZrO_2$ basis is contained for 100 parts by weight of the sintered oxide while Zr is uniformly distributed in the sintered oxide and thickness of the grain boundary phase in the sintered body is 20 nm or less, which improves the mechanical strength and reduces the core loss further. The reason for setting the Zr content within the range from 0.001 to 0.6 parts by weight on $ZrO_2$ basis is that when the content is less than 0.001 parts by weight, mechanical strength cannot be significantly improved and, when the content is more than 0.6 parts by weight, electrical resistivity cannot be significantly increased. When 0.001 to 0.6 parts by weight of Zr on $ZrO_2$ basis is contained, mechanical strength can be increased significantly and the core loss can be reduced further. By distributing Zr uniformly in the sintered oxide, potential energy of the magnetic walls to migrate can be reduced so that the magnetic walls can move easily resulting in less hysteresis loss and less core loss. When the grain boundary phase is 20 nm or less in thickness, potential energy of the magnetic walls to migrate can be reduced further, leading to further reduction in core loss.

Thickness of the grain boundary phase refers to the thickness of the intergranular layer of the crystal, indicating the maximum thickness of the grain boundary phase in the sintered body, which can be determined by measuring the thickness of the grain boundary phase at ten points with a transmission electron microscope magnifying 50,000 times, for example, and taking the largest measurement.

In order to obtain a ferrite core for RFID application having far less core loss, Zr content on $ZrO_2$ basis is preferably within a range from lower limit of 0.01 parts by weight to upper limit of 0.4 parts by weight.

The state of having Zr distributed uniformly in the sintered body refers to such a state as, with ten rectangular areas each measuring 3.7 μm by 2.8 μm arbitrarily selected in the surface of the sintered body, when each area is irradiated with 10 points of electron beam and Zr is detected by 8 points or more in every area using an energy dispersion type X-ray micro analyzer.

It is preferable that the difference between the mean crystal grain size on the surface of the ferrite core for RFID application 14 and the mean crystal grain size inside thereof is within 10 μm. This makes it possible to decrease the stress tensor generated between crystal grains due to the difference in mean crystal grain size between the surface and inside so that the internal stress in the ferrite core for RFID application 14 can be decreased, thus resulting in the ferrite core for RFID application 14 having high mechanical strength that prevents breaking and chipping when installed on a vehicle tire. The difference between the mean crystal grain size on the surface and the mean crystal grain size in the central portion is more preferably within 5 μm.

The difference in mean crystal grain size is measured, for example, as follows. Cleaved surface showing the inner structure of the ferrite core for RFID application 14, polished to mirror finish, and the original surface are observed with a scanning electron microscope to determine the difference in mean crystal grain size between the inside (center) and the surface. The mean crystal grain size of the inner structure is measured near the center of thickness of the ferrite core for RFID application. In the measurement of the difference in mean crystal grain size, too, crystal grains not larger than 0.2 μm are omitted from the calculation of the mean crystal grain size, since these small grains do not have significant influence on the magnetic permeability and are difficult to measure.

The ferrite core for RFID application 14 of the present invention preferably has magnetic permeability of 400 or higher, which makes it possible to obtain high induced electromotive force and high sensitivity. Magnetic permeability is more preferably 500 or higher.

Magnetic permeability is measured by winding a coated electrically conductive wire having diameter of 0.2 mm by seven turns around a toroidal ring measuring 130 mm in outer diameter, 80 mm in inner diameter and 3 mm in thickness evenly over the entire circumference thereof, and using an LCR meter operating at frequency 100 kHz.

The ferrite core for RFID application 14 of the present invention preferably has relative temperature coefficient of the magnetic permeability over a range from −50 to 150° C. in a range from $-2 \times 10^{-6}$ to $2 \times 10^{-6}$/° C. This makes it possible to obtain a ferrite coil that shows stable induced electromotive force and sensitivity even when the temperature changes in a range from −50 to 150° C.

The relative temperature coefficient is determined by connecting a toroidal ring measuring 130 mm in outer diameter, 80 mm in inner diameter and 3 mm in thickness having a coated electrically conductive wire of diameter of 0.2 mm wound thereon by seven turns evenly over the entire circumference thereof, to a measuring fixture that is placed in a thermostat and is connected to an LCR meter operating at frequency 100 kHz, and measuring the magnetic permeability over a temperature range from −50 to 150° C. with the reference temperature set to 20° C. Denoting the magnetic permeability at −50° C. as $\mu_{-50}$ and magnetic permeability at 150° C. as $\mu_{150}$, relative temperature coefficient (1/° C.) of the magnetic permeability over the range from −50 to 150° C. is given as $(\mu_{-50}-\mu_{150})/(\mu_{150}^2 \times (-50-150))$.

Density of the ferrite core for RFID application 14 of the present invention is preferably 5.0 g/cm³ or higher. This makes it possible to obtain a ferrite coil that has further higher mechanical strength and higher induced electromotive force. In case the ferrite core for RFID application 14 is provided with an electrically conductive wire 22 wound thereon so as to make a ferrite coil, the ferrite core for RFID application 14 is provided with an electrically conductive wire 22 wound thereon and, if necessary, is then molded with a resin. When density of the ferrite core for RFID application 14 is lower than 5.0 g/cm$^3$, the resin tends to infiltrate into the ferrite core for RFID application 14 during the process of molding with the resin, thus making it impossible to achieve significant improvement of the induced electromotive force. When density of the ferrite core for RFID application 14 is lower than 5.0 g/cm$^3$, it also becomes impossible to achieve significant improvement of the mechanical strength. Density is more preferably 5.2 g/cm$^3$ or higher. Density referred to herein is apparent density measured by Archimedes' method.

The ferrite core for RFID application 14 of the present invention preferably has strength of 140 MPa or higher as measured by 3-point bending test. This makes it possible to further improve the mechanical reliability when a ferrite coil 30 installed in a vehicle tire is subjected to mechanical vibration. The strength measured by 3-point bending test is more preferably 160 MPa or higher.

The 3-point bending test is carried out according to JIS R1601 or by applying load with cross head speed of 0.5 mm/min. at the center of spacing L (mm) between supports in the longitudinal direction of a sample having prism shape measuring W mm in width and T mm in thickness supported at two points at spacing of L (mm), and measuring maximum load P (N) before breakage, from which strength is calculated by 3PL/2WT$^2$.

Changes in inductance of the ferrite core for RFID application 14 of the present invention under a pressure of 50 MPa per 1 mm$^2$ are preferably within ±10%. This makes it possible to reduce the variations in the induced electromotive force when the ferrite coil 30 molded with a resin is subjected to a magnetic field of a certain intensity. When changes in inductance L exceed ±10%, magnetic permeability changes and a significant reduction in the variations of induced electromotive force cannot be achieved. Changes in inductance L are more preferably within ±2%.

Change in inductance is determined by applying uniaxial pressure on the free surface of a sample of prism shape measuring 3 mm in width, 3 mm in thickness and 15 mm in length fastened onto a base, and measuring the inductance while changing the load, using a push-pull gage.

Mechanical reliability of the ferrite core for RFID application 14 of the present invention can be improved further by setting the fracture toughness measured by IF method (indentation-fracture method) to 0.8 MPa·ml$^{1/2}$ or higher. The IF method measures the fracture toughness from the length of dent and crack by generating a Vickers dent on the surface of a test piece. The reason that mechanical reliability is improved by setting the fracture toughness measured by IF method to 0.8 MPa·m$^{1/2}$ or higher is as follows.

When the ferrite core for RFID application 14 is installed on a vehicle tire for the measurement of pressure and temperature, the ferrite core for RFID application 14 is subjected to mechanical vibration over a very long period of time. To prevent the ferrite core for RFID application 14 from cracking due to the mechanical vibration, fracture toughness measured by IF method must be at least 0.8 MPa·m$^{1/2}$ or higher.

Core loss and surface resistivity of the ferrite core for RFID application 14 are measured as described below.

Figure 3:
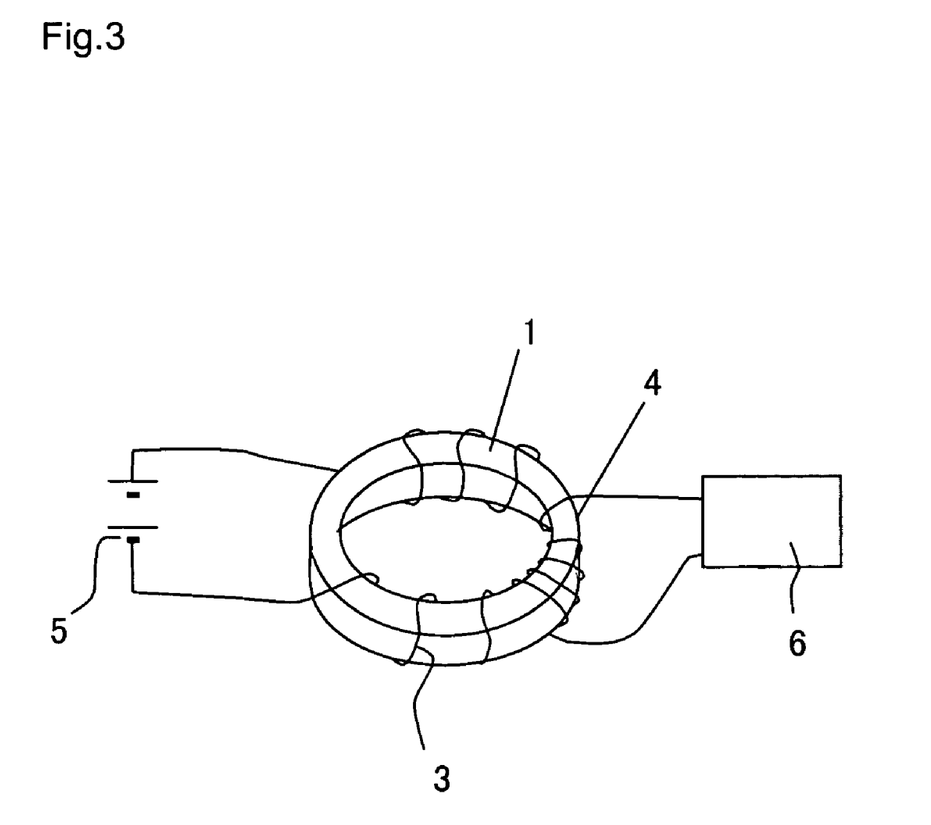
FIG. 3 is a schematic diagram showing a method of measuring the core loss of the ferrite core for RFID application according to the present invention.

A toroidal core 1 made of the sintered ferrite is provided with 10 turns of a primary winding 3 and 10 turns of a secondary winding 4 wound around the toroidal core 1 using a coated copper wire 0.2 mm in diameter, with the primary winding 3 connected to a power source 5 and the secondary winding 4 connected to a magnetic flux meter 6, and the core loss is measured under conditions of 50 kHz and 150 mT.

Surface resistivity is measured at a temperature of 25° C. by attaching leads to both ends of the ferrite core, or in the procedure specified in JIS C2141.

Now the method of manufacturing the ferrite core for RFID application 14 according to the present invention will be described.

The method of manufacturing the ferrite core for RFID application according to the present invention comprises a primary crushing step of making a primary crushed powder having a specific surface area exceeding 5 m$^2$/g by mixing and crushing a powder containing at least a powder of Fe oxide, a powder of Ni oxide and a powder of Zn oxide, wherein content of the Fe oxide is from 48.6 to 53.9 mol % on Fe$_2$O$_3$ basis, content of the Ni oxide is from 12.3 to 35.2 mol % on NiO basis and content of the Zn oxide is from 16.4 to 37.0 mol % on ZnO basis, and at least one of the Fe oxide, Ni oxide and Zn oxide having a specific surface area exceeding 5 m$^2$/g is mixed and crushed, a calcination step of calcinating the primary crushed powder so as to make calcined powder, a secondary crushing step of crushing the calcined powder to make secondary crushed powder having a specific surface area exceeding 5 m$^2$/g, a forming step of forming a green body by mixing the secondary crushed powder and an organic binder, granulating the mixture and molding the granulated material, a debinding step of removing the organic binder from the green body to make a debound green body having carbon content of 300 ppm or less, and a firing step of firing the debound green body in a firing furnace at a temperature from 1050 to 1300° C. to make the ferrite core for RFID application made of a sintered body. The method of manufacturing the ferrite core for RFID application 14 according to the present invention will be discussed in more detail below.

In the first crushing step, the primary crushed powder having a specific surface area exceeding 5 m$^2$/g is made by mixing and crushing a powder containing at least a powder of Fe oxide, a powder of Ni oxide and a powder of Zn oxide, wherein content of the Fe oxide is from 48.6 to 53.9 mol % on Fe$_2$O$_3$ basis, content of the Ni oxide is from 12.3 to 35.2 mol % on NiO basis and content of the Zn oxide is from 16.4 to 37.0 mol % on ZnO basis, and at least one of the Fe oxide, Ni oxide and Zn oxide having a specific surface area exceeding 5 m$^2$/g is mixed and crushed High values of surface resistivity, magnetic permeability and Curie temperature can be achieved by setting the proportions of the metal oxides in the ranges described above. The primary crushed powder consisting of the component powders having particle sizes in a range from several nanometers to several tens of nanometers that are homogeneously mixed with specific surface area exceeding 5 m$^2$/g can be made by crushing and mixing the materials in a vibration mill or the like to prepare primary crushed powder A having a specific surface area exceeding 5 m$^2$/g. Thus it is made possible to promote the ordering of the crystalline structure of the crystal having spinel structure contained in the sintered body, thereby to decrease the FWHM of the sintered body. The primary crushed powder A preferably contains not more than 5% by volume of particles measuring 1 μm or more across. Specific surface areas of Fe$_2$O$_3$, ZnO and NiO powders are measured by BET method.

Sintering characteristic can be improved by using CuO as the starting material in a proportion in the range described above, or adding 9 parts by weight or less for 100 parts by weight of the calcined powder.

Then the primary crushed powder is calcined so as to prepare calcined powder in the calcination step, and the calcined powder is crushed to prepare the secondary crushed powder with specific surface area exceeding 5 m$^2$/g in the secondary crushing step.

Since the power consisting of Fe oxide, the power consisting of Ni oxide and the power consisting of Zn oxide which are contained in the primary crushed powder can be caused to undergo sufficient chemical reaction in the calcination step, such a calcined powder can be made that contains a powder of which main crystal has spinel structure. In the secondary crushing step, first, sintering activity of the secondary crushed powder can be improved and variations in the crystal grain size of the sintered body can be reduced. Second, since contents of oxides (for example, NiO and Fe$_2$O$_3$) without spinel structure can be reduced and localized unevenness in the composition of the sintered body can be suppressed, the sintered body can be formed mostly from crystal that has spinel type crystal phase with ordered crystalline structure. This makes it possible to decrease the FWHM of the sintered body, and the ferrite core for RFID application 14 made of the sintered body has lower core loss and higher magnetic permeability.

Specifically, the primary crushed powder is heated at a temperature raising rate of 250° C./hour, held at a temperature from 700 to 900° C. for two to ten hours, cooled down at a rate of 100° C./hour thereby carrying out calcination, then the calcined powder is mixed with water and subjected to wet milling in a ball mill, so as to prepare a secondary slurry. Secondary crushed powder B contained in the secondary slurry is controlled to have specific surface area exceeding 5 m$^2$/g. Specific surface area of the secondary crushed powder B contained in the secondary slurry is measured by BET method after drying the secondary slurry.

Zr is dispersed in the sintered body as follows. The power consisting of Fe oxide, the power consisting of Ni oxide, the power consisting of Zn oxide, CuO powder and the Zr oxide having a mean particle size of 0.4 μm or less are mixed in proportions described previously. Then the mixed powder is crushed in a ball mill, beads mill or the like so as to make the primary crushed powder having a specific surface area exceeding 5 m$^2$/g which contains Zr uniformly dispersed therein, and is then calcined under the conditions described above. If Zr oxide having a mean particle size exceeding 0.4 μm is used, sintered body having Zr uniformly dispersed therein cannot be obtained.

When the primary crushed powder and the secondary crushed powder have specific surface area exceeding 5 m$^2$/g, crystallization of the ferrite crystal (two or more kinds of solid solution selected from NiFe$_2$O$_4$, ZnFe$_2$O$_4$ and FeFe$_2$O$_4$) that contains Fe as the main component and has spinel structure is accelerated, so that contents of oxides (for example, NiO and Fe$_2$O$_3$) without spinel structure can be reduced and localized unevenness in the composition of the sintered body is eliminated. As a result, since composition of the crystal having spinel structure is prevented from significantly deviating from definite proportions, such a ferrite core for RFID application 14 is obtained as crystalline structure of the solid solution is ordered with decreasing FWHM and improved magnetic permeability, and the crystal grain sizes are controlled within the range described previously.

By carrying out the calcination process by heating at a temperature raising rate of 250° C./hour and holding the temperature in a range from 700 to 900° C. for two to ten hours, it is made possible to further promote the crystallization into ferrite crystal of spinel structure by using a powder of large specific surface area that has high sintering characteristic, thereby to improve the magnetic permeability. When heated at a temperature raising rate of 150° C./hour or less during calcination, magnetic permeability of 400 or higher can be achieved.

In order to control the thickness of the grain boundary phase within 20 nm, the temperature raising rate is set to 20° C./hour or less during calcination. This is because it is made possible to suppress the generation of grain boundary phase made of CuO and NiO and make the thickness of the grain boundary phase as small as 20 nm or less, by raising the temperature very slowly from the starting temperature to the finishing temperature of crystallization of the ferrite crystal of spinel structure.

The ferrite core for RFID application 14 having density of 5.0 g/cm$^3$ or higher can be made by setting the specific surface area to 6 m$^2$/g or higher and controlling the proportion of particles not smaller than 1 μm to within 4% by volume.

In the molding step, granular material made by mixing the secondary crushed powder and an organic binder and granulating the mixture is molded to form a green body.

Specifically, the secondary slurry and an organic binder such as polyvinyl alcohol or polyethylene glycol polymer are mixed and the resultant slurry is granulated by spray drying method or the like, with the granular material thus obtained being formed into the shape of the ferrite core for RFID application 14 such as prism, tube or ring, thereby making the green body.

By forming the green body with relative density of 50% or higher, changes in inductance under compressive stress of 50 MPa per 1 mm$^2$ can be controlled within ±10%.

Then in the debinding step, the organic binder is removed from the green body so as to make debound green body of which carbon content is 300 ppm or less. Thus carbon contained in the debound green body is prevented from reacting with oxygen and generating lattice defects such as oxygen defects during firing, resulting in improved mechanical strength. Carbon content in the sintered body can also be reduced, so that surface resistivity of the sintered body can be increased and core loss can be made smaller.

Last, in the sintering step, the debound green body is fired at a temperature from 1050 to 1300° C. in a furnace, so as to make the ferrite core for RFID application from the sintered body.

As the firing temperature is set to 1050° C. or higher, firing shrinkage of the ferrite green body almost completes at a temperature near 1050° C., and growth of crystal of which main crystal phase is the solid solution and ordering of the crystalline structure begin. Therefore, by controlling the duration of firing at a temperature from 1050 to 1300° C. that is the temperature where growth of crystal grains and ordering of crystalline structure are accelerated, it is made possible to grow the crystal of the solid solution of ordered structure in the sintered body thus obtained, while keeping the mean crystal grain size in a range from 2 to 15 μm and the number of crystal grains having sizes in a range from 0.5D to 3D to 60% or more of the total number of crystal grains, thereby achieving a high value of magnetic permeability.

In addition, by holding the temperature in a range from 1200 to 1300° C. for two to five hours, relative temperature coefficient of the magnetic permeability over a range from −50 to 150° C. can be controlled within the range from −2×10⁻⁶ to 2×10⁻⁶/° C.

By setting temperature raising rate in a range from 50 to 100° C./hour, holding the temperature in a range from 1050 to 1300° C. for one to ten hours and lowering the temperature to a rate of 200° C./hour or lower, it is made possible to not only sinter the material and grow the crystal grains homogeneously from the surface to the inside, but also mitigate the lattice strains in the sintered body when lowering the temperature, and therefore internal stress is markedly reduced so that the ferrite core for RFID application 14 having strength of 140 MPa or higher as measured by 3-point bending test can be manufactured.

The reason for heating at a temperature raising rate of 50 to 200° C./hour from 750 to 1050° C. is that firing shrinkage of the ferrite green body completes substantially during this temperature raising process, and therefore mechanical strength can be improved by controlling the temperature raising rate in this process. Particularly since it is made possible to sinter the material and grow the crystal grains homogeneously from the surface to the inside by heating at a temperature raising rate of 50 to 100° C./hour, the difference between the mean crystal grain size in the surface of the ferrite core for RFID application 14 and the mean crystal grain size in the inside can be suppressed to 10 μm or less. This makes it possible to manufacture the ferrite core for RFID application 14 having less internal stress and higher mechanical strength.

The ferrite core for RFID application 14 made by the manufacturing method described above has low and stable core loss, high magnetic permeability with less variability and high Curie temperature.

According to the manufacturing method described above, such a ferrite core for RFID application 14 can be manufactured as the FWHM of the diffraction peak of the crystal phase with diffraction angle 2θ in a range from 34.6 to 36.4° as measured by X-ray diffraction analysis using Cu—Kα beam is 0.4° or less. The ferrite core for RFID application 14 also has high Curie temperature of 120° or higher and magnetic permeability of 200 or higher with less variations.

To make a ferrite coil by using the ferrite core for RFID application 14 made as described above, an electrically conductive wire 22 made of, for example, copper having diameter of 0.02 to 0.2 mm that is coated on the surface with enamel or a resin for insulation is wound as shown in FIG. 4A to D. In order to increase the induced electromotive force, it is preferable to wind the electrically conductive wire 22 around the ferrite core for RFID application 14, for example, from left to right and from right back to left without going significantly beyond the ferrite core for RFID application 14, or the electrically conductive wire 22 is wound densely without space between adjacent turns.

Figures 4A, 4B:
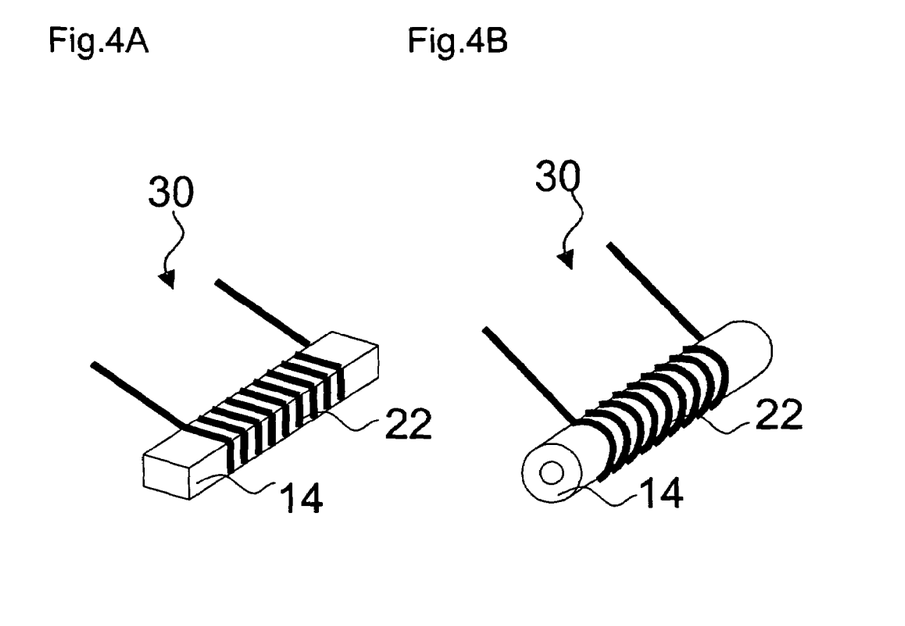
FIG. 4A to D are perspective views showing a ferrite coil using the ferrite core for RFID application according to the present invention.

The ferrite core for RFID application 14 of the present invention is such that the sensitivity per one turn of winding of the electrically conductive wire 22 that is determined by dividing the induced electromotive force, generated in the ferrite coil when a magnetic field is applied thereto, by the intensity of the applied magnetic field divided by the cross sectional area of the ferrite core in the portion whereon the electrically conductive wire is wound is 1 mV/(μT·mm²) or higher. When this value S is less than 1 mV/(μT·mm²), activating switch of a pressure sensor or temperature sensor of vehicle tire cannot normally function. Preferably the value S is 2 mV/(μT·mm²) or higher. In case the ferrite core for RFID application 14 has a tubular shape as shown in FIG. 4B, the cross sectional area is calculated by omitting the hollow space of the ferrite core. The ferrite core of the present invention is made by winding an electrically conductive wire around the circumference of, for example, the ferrite core for RFID application 14 (measuring, in the case shown in FIG. 4A, 1.2 mm by 1.2 mm by 20 mm) in the longitudinal direction.

Figure 4C:
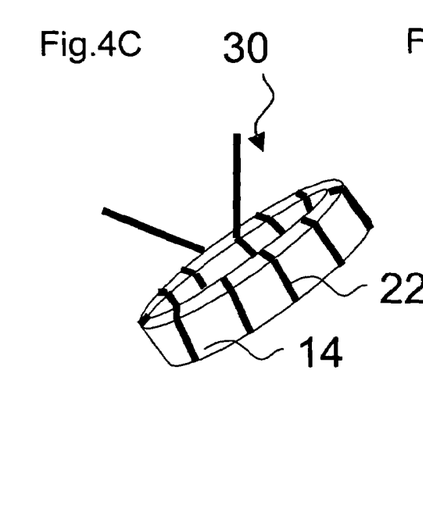
Figure 4D:
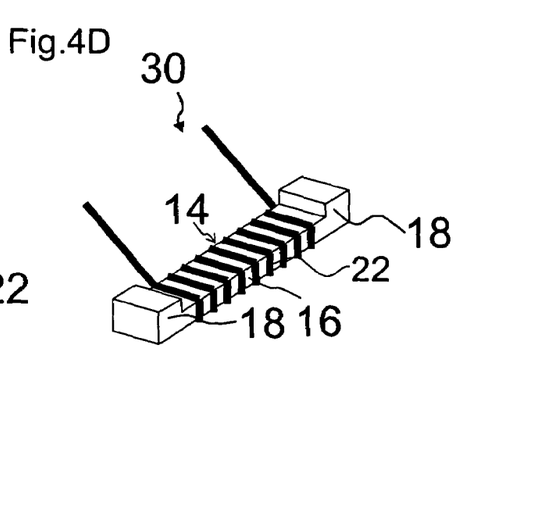

To install the ferrite coil 30 for RFID application on an RFID apparatus or member for the purpose of notifying the air pressure or temperature of a vehicle tire or keyless entry, end of the electrically conductive wire 22 of the ferrite coil 30 such as shown in FIG. 4 is connected to a pressure sensor, a temperature sensor or an antenna incorporated in a key, so as to function as a trigger to measure the tire air pressure or temperature or open the vehicle door with the induced electromotive force.

The induced electromotive force and the sensitivity of the ferrite coil 30 of the present invention are measured, for example, as follows. An electrically conductive wire 0.2 mm in diameter is wound 34 turns around a portion 8 mm long, 4 mm to the left and 4 mm to the right from the center in the longitudinal direction of the ferrite core for RFID application 14 having prism shape measuring 1.44 mm in width, 1 mm in thickness and 11 mm in length. A portion 150 to 200 mm in length of the electrically conductive wire 22 is lead from either end of the ferrite core for RFID application 14 thereby making the ferrite coil 30. The ferrite coil 30 is placed at the center of a Helmholtz coil that is connected to a pulse generator operating at a frequency of 100 to 130 kHz. With constant magnetic field generated with the Helmholtz coil, ends of the electrically conductive wire 22 of the ferrite coil 30 are connected to an oscilloscope to measure the induced electromotive force induced in the ferrite core for RFID application 14 of prism shape. Sensitivity is determined by dividing the induced electromotive force by the intensity of the magnetic field applied.

EXAMPLES

As the starting material, powders of $Fe_2O_3$ having a specific surface area of 5 m²/g as measured by BET method, ZnO, NiO and CuO having a specific surface area from 1 to 2 m²/g as measured by BET method, and $ZrO_2$ having a mean particle size of 0.3 μm were crushed and mixed in a wet crushing process by a vibration mill. Resultant powder $A_1$ was calcined under the conditions shown in Table 1, and the calcined powder was mixed with pure water and crushed in wet process by a ball mill. Powder $B_1$ obtained by crushing the calcined powder had specific surface area shown in Table 2. 3 Parts by weight of polyvinyl alcohol was added as a binder to 100 parts by weight of powder $B_1$, and the mixture was granulated by spray drying method. The granulated material was molded into a green body of predetermined shape such as prism, tube or ring by press molding with a molding die. The green body debound at the temperature shown in Table 2 for three hours, then the temperature was raised from 750 to 1050° C. at the rate shown in Table 2. The green body was then fired under the temperature holding condition and temperature decreasing rate shown in Table 2, thereby making the samples No. 1 to 12 of the ferrite core for RFID application 14. Compositions of the samples are shown in Table 1. Relative density of the green body was determined by (density of green body/theoretical density)×100 (%). Carbon content in the debound material was measured with a carbon analyzer (Model EMIA-511, manufactured by HORIBA, Ltd.).

FWHM of the diffraction peak of the crystal phase with diffraction angle 2θ in a range from 34.6 to 36.4° was measured by X-ray diffraction analysis using Cu—Kα beam. The peak was identified as a solid solution of $ZnFe_2O_4$ of JCPDS (Joint Committee on Powder Diffraction Standards) card No. 22-1012, $FeFe_2O_4$ of JCPDS card No. 19-629 and $NiFe_2O_4$ of JCPDS card No. 10-325. More specifically, the FWHM was determined as follows. With the intensity of the highest peak (P) observed in the X-ray diffraction analysis as shown in FIG. 1, located at 2θ=34.6 to 36.4°, denoted as $P_1$, a line was drawn parallel to the horizontal axis of 2θ at the height of $P_1/2$. Then the distance between the points where the line crosses the peak (P) was taken as the FWHM.

Crystal grain sizes of the sample were measured as follows. Surface of the sample was observed with a scanning electron microscope (Model S-800, manufactured by Hitachi, Ltd.) and a crystallogram was taken on which incircle and circumcircle were drawn for each crystal grain, and the average of the incircle and the circumcircle was taken as the size of the crystal grain. All crystal grain sizes were averaged to give the mean crystal grain size, and proportion of the crystal grains having sizes in a range from 0.5 D to 3 D to the total number of crystal grains was determined. In the measurement of crystal grain size, crystal grains not larger than 0.2 μm were omitted from the calculation of the crystal grain size, since they do not have significant influence on the magnetic permeability.

The difference ΔD in mean crystal grain size between the surface and inside of the sample was measured as follows. Cleaved surface showing the inner structure of the sample, polished to mirror finish and heat-treated so that the crystalline structure can be seen, and the original surface were observed with a scanning electron microscope (Model S-800, manufactured by Hitachi, Ltd.) to determine the difference in mean crystal grain size between the inside and the surface (mean crystal grain size on the surface minus mean crystal grain size of the inside). In the measurement of the difference in mean crystal grain size, too, crystal grains not larger than 0.2 μm were omitted from the calculation of the difference in the mean crystal grain size, since they do not have significant influence on the magnetic permeability.

Thickness of the grain boundary phase was determined by measuring at ten points with a transmission electron microscope magnifying 100,000 times and taking the largest measurement as the thickness of the grain boundary phase.

Dispersion of Zr was determined as described below. With ten areas each measuring 3.7 μm by 2.8 μm arbitrarily selected in the surface of the sintered body, each area was irradiated with 10 points of electron beam, total of 100 points for all areas, using an energy dispersion type X-ray micro analyzer and the proportion of points of Zr detection was taken as shown in Table 1. Sample with proportion of 80% or higher was evaluated as uniformly dispersed, and sample with proportion of less than 80% was evaluated as non-uniformly dispersed.

Core loss of the sample was measured as follows. A toroidal core 1 made of the sintered ferrite was provided with 10 turns of the primary winding 3 and 10 turns of the secondary winding 4 wound around the toroidal core 1 using coated copper wires 0.2 mm in diameter, with the primary winding 3 connected to the power source 5 and the secondary winding 4 connected to the magnetic flux meter 6, and the core loss was measured under conditions of 50 kHz, 150 mT and 80° C.

Various properties of the samples were measured as described below. Magnetic permeability was determined by winding a coated electrically conductive wire having diameter of 0.2 mm by seven turns evenly around a toroidal ring measuring 13 mm in outer diameter, 8 mm in inner diameter and 3 mm in thickness over the entire circumference thereof, measuring the permeability using an LCR meter operating at frequency 100 kHz, and averaging the measured values of 30 specimens made for each sample No. The relative temperature coefficient was determined by connecting a toroidal ring measuring 13 mm in outer diameter, 8 mm in inner diameter and 3 mm in thickness provided with a coated electrically conductive wire 0.2 mm in diameter wound thereon by seven turns evenly over the entire circumference thereof, to a measuring fixture that is installed in a thermostat and is connected to an LCR meter, and measuring the magnetic permeability over a range from −50 to 150° C. with the reference temperature set to 150° C. With regard to density, apparent density was measured by Archimedes' method. Surface resistivity is measured at a temperature of 25° C. by attaching leads to both ends of the ferrite core 3 mm in thickness. Change in inductance is determined by applying uniaxial pressure on the free surface of a sample of prism shape measuring 3 mm in width, 3 mm in thickness and 15 mm in length that is fastened onto a base, and measuring the inductance while changing the load, using a push-pull gage. Strength of 3-point bending was measured according to JIS R1601. Fracture toughness was measured by IF method according to JIS R1607-1995.

30 ferrite cores 14 were made for each of Nos. 1 to 12, and difference between the highest and lowest values of magnetic permeability among the 30 specimens was determined.

The induced electromotive force and the sensitivity of the ferrite coil 30 of the present invention were measured as described below. An electrically conductive wire 0.2 mm in diameter was wound 34 turns around a portion 8 mm long, 4 mm to the left and 4 mm to the right from the center in the longitudinal direction of the ferrite core for RFID application 14 having prism shape measuring 1.44 mm in width, 1 mm in thickness and 11 mm in length. A portion 150 to 200 mm in length of the electrically conductive wire 22 was lead from either end of the ferrite core thereby making the ferrite coil. The ferrite coil 30 was placed at the center of a Helmholtz coil that was connected to a pulse generator operating at a frequency of 120 kHz. With constant magnetic field generated with the Helmholtz coil, ends of the electrically conductive wire 22 of the ferrite coil 30 were connected to an oscilloscope to measure the induced electromotive force induced in the ferrite core for RFID application 14 of prism shape. Sensitivity per one turn of the electrically conductive wire 22 was determined by dividing the induced electromotive force by the intensity of the magnetic field, and further dividing it by the number of winding turns.

TABLE 1

| | | | | | | Powder $A_1$ | | Calcination conditions | | |
|---|---|---|---|---|---|---|---|---|---|---|
| Sample No. | $Fe_2O_3$ mol % | NiO mol % | ZnO mol % | CuO parts by weight | $ZrO_2$ parts by weight | Specific surface area $m^2/g$ | Grain 1 μm or more vol % | Temperature raising rate ° C./Hr | Holding times in range from 700~900° C. Hr | Temperature decreasing rate ° C./Hr |
| 1 | 48.6 | 17.1 | 34.3 | 0 | 0 | 6.5 | 3.3 | 240 | 2 | 80 |
| 2 | 51.3 | 16.2 | 32.5 | 0 | 0 | 7.8 | 4 | 130 | 8 | 80 |

TABLE 1-continued

| | | | | | | Powder $A_1$ | | Calcination conditions | | |
|---|---|---|---|---|---|---|---|---|---|---|
| Sample No. | $Fe_2O_3$ mol % | NiO mol % | ZnO mol % | CuO parts by weight | $ZrO_2$ parts by weight | Specific surface area $m^2/g$ | Grain 1 μm or more vol % | Temperature raising rate ° C./Hr | Holding times in range from 700~900° C. Hr | Temperature decreasing rate ° C./Hr |
| 3 | 53.9 | 15.4 | 30.7 | 0 | 0 | 8.2 | 2.5 | 100 | 10 | 80 |
| 4 | 50.8 | 12.3 | 36.9 | 0 | 0 | 7.3 | 2.2 | 90 | 5 | 80 |
| 5 | 50.8 | 19.7 | 29.5 | 0 | 0 | 9 | 1.6 | 80 | 8 | 80 |
| 6 | 50.0 | 33.6 | 16.4 | 0 | 0 | 10.1 | 3.5 | 50 | 10 | 80 |
| 7 | 49.6 | 13.4 | 37.0 | 1 | 0.05 | 9.3 | 3.7 | 20 | 5 | 80 |
| 8 | 50.8 | 16.4 | 32.8 | 5 | 0.2 | 8.4 | 2.5 | 10 | 8 | 80 |
| 9 | 48.7 | 34.8 | 16.5 | 9 | 0.4 | 6.3 | 2.8 | 15 | 2 | 80 |
| 10 | 50.8 | 16.4 | 32.8 | 0 | 0.3 | 7.5 | 2.9 | 20 | 5 | 80 |
| 11 | 50.8 | 16.4 | 32.8 | 0 | 0 | 9.4 | 3 | 120 | 9 | 80 |
| 12 | 50.8 | 16.4 | 32.8 | 0 | 0 | 6.7 | 1.1 | 140 | 5 | 80 |
| *13 | 50.8 | 16.4 | 32.8 | 0 | 0 | 6.3 | 2.7 | 130 | 7 | 80 |
| *14 | 50.8 | 16.4 | 32.8 | 10 | 0 | 7.8 | 3.9 | 100 | 2 | 80 |
| *15 | 48.0 | 17.6 | 34.4 | 0 | 0 | 2.1 | — | 230 | 8 | 80 |
| *16 | 54.0 | 15.3 | 30.7 | 0 | 0.05 | 5.5 | 20 | 50 | 2 | 80 |
| *17 | 52.0 | 12.0 | 36.0 | 0 | 0.1 | 6 | 2.6 | 30 | 7 | 80 |
| *18 | 48.0 | 35.4 | 16.6 | 0 | 0 | 5.3 | 2.8 | 250 | 9 | 80 |
| *19 | 53.0 | 31.0 | 16.0 | 0 | 0 | 5.6 | 3.7 | 230 | 10 | 80 |
| *20 | 49.7 | 13.0 | 37.3 | 9 | 0 | 6.1 | 2.4 | 120 | 6 | 80 |

Sample numbers marked with * are not within the scope of the present invention.

TABLE 2

| Sample No. | Specific surface area of powder $B_1$ $m^2/g$ | Relative density of green body % | Temperature debinding ° C. | Carbon contents of debound green body ppm | Firing conditions | | | |
|---|---|---|---|---|---|---|---|---|
| | | | | | Temperature raising rate ° C./Hr | Holding temperature ° C. | Holding time Hr | Temperature decreasing rate ° C./Hr |
| 1 | 6.8 | 55 | 500 | 140 | 80 | 1250 | 3 | 200 |
| 2 | 7.4 | 60 | 500 | 160 | 90 | 1270 | 3 | 150 |
| 3 | 8 | 53 | 600 | 130 | 50 | 1230 | 5 | 100 |
| 4 | 7.2 | 55 | 600 | 130 | 70 | 1220 | 4 | 150 |
| 5 | 8.3 | 58 | 700 | 100 | 60 | 1280 | 4 | 50 |
| 6 | 8.1 | 57 | 700 | 100 | 90 | 1250 | 5 | 100 |
| 7 | 6.7 | 52 | 500 | 150 | 70 | 1270 | 3 | 200 |
| 8 | 5.8 | 54 | 500 | 170 | 100 | 1230 | 4 | 150 |
| 9 | 6 | 58 | 600 | 140 | 70 | 1220 | 4 | 100 |
| 10 | 7.5 | 59 | 600 | 120 | 90 | 1280 | 2 | 100 |
| 11 | 6.7 | 50 | 700 | 100 | 60 | 1300 | 2 | 50 |
| 12 | 8.2 | 51 | 700 | 100 | 80 | 1150 | 5 | 150 |
| *13 | 2.1 | 50 | 400 | 350 | 250 | 1100 | 3 | 250 |
| *14 | 3 | 52 | 400 | 320 | 250 | 1240 | 8 | 250 |
| *15 | 6.4 | 55 | 500 | 150 | 250 | 1260 | 8 | 250 |
| *16 | 5.6 | 35 | 500 | 150 | 250 | 1100 | 3 | 250 |
| *17 | 6.3 | 36 | 500 | 140 | 250 | 1150 | 2 | 250 |
| *18 | 6.1 | 51 | 500 | 140 | 250 | 1060 | 4 | 250 |
| *19 | 5.8 | 53 | 500 | 140 | 250 | 1200 | 5 | 250 |
| *20 | 5.1 | 54 | 500 | 140 | 250 | 1220 | 4 | 250 |

Sample numbers marked with * are not within the scope of the present invention.

Results of the measurements are shown in Tables 3, 4. The results show that the ferrite core for RFID application 14 of the present invention has core loss of 250 kW/m³ or less, Curie temperature of 120° C. or higher, and mean magnetic permeability of 200 or higher among 30 specimens. Samples Nos. 2 to 5 and 7 to 12, in particular, showed high mean magnetic permeability of 400 or higher. Difference Δμ between highest and lowest values of magnetic permeability was as small as 4 or less. Samples Nos. 1 to 11 had small absolute value of relative temperature coefficient of the magnetic permeability over a range from −50 to 150° C. in a range from −2×10⁻⁶ to 2×10⁻⁶/° C. Samples Nos. 1 to 12 of the present invention had high densities of 5.2 g/cm³ or higher, high strength of 3-point bending of 140 MPa or higher, and small changes in inductance within ±10%. Samples Nos. 1 to 12 showed smaller difference of 4 or less between highest and lowest values of magnetic permeability. Samples Nos. 7 to 10 had particularly high bending strength of 170 MPa or higher.

Also as shown in Table 4, samples Nos. 1 to 12 of the ferrite coil 30 made by using the ferrite core of the present invention showed induced electromotive force of 20 mV or higher. The value $S_1$ determined by dividing the sensitivity per one turn of the winding, obtained by dividing the induced electromotive force by the intensity of the magnetic field, by the cross sectional area of the ferrite core was 1 mV/(μT·mm$^2$) or higher.

Then the following samples were made as comparative examples and were evaluated similarly to the samples. First, samples Nos. 16 to 20 were made having contents of Fe, Ni and Zn on the basis of $Fe_2O_3$, NiO, ZnO out of the ranges of the present invention. Then samples Nos. 13 to 15 of ferrite core having FWHM out of the ranges of the present invention were made by controlling the specific surface area of powder $A_1$ to 5 m$^2$/g or less or controlling the specific surface area of powder $B_1$ to 5 m$^2$/g or less. Conditions of fabricating these comparative examples were similar to those of the examples, except for those shown in Tables 1, 2.

The samples Nos. 13 to 20 of ferrite core made as comparative examples showed core loss of 300 kW/m$^3$ or higher, mean magnetic permeability of 200 or less and/or Curie temperature of lower than 120° C. Difference between highest and lowest values of magnetic permeability was as large as 20 or more. There were such drawbacks as in sample No. 18 of which relative temperature coefficient of the magnetic permeability over a range from −50 to 150° C. was as high as 32×10$^{-6}$/° C., sample No. 16 of which density was less than 5.0 g/cm$^3$, samples Nos. 13, 14, 20 that showed strength of less than 140 MPa as measured by 3-point bending test, and samples Nos. 16 and 17 which showed changes in inductance beyond the range of ±10%. Ferrite coils were made by winding electrically conductive wires around the ferrite cores of the comparative examples, and induced electromotive force and sensitivity were measured similarly to the example, with results shown in Table 2 indicating that samples Nos. 13 to 20 had induced electromotive force of lower than 20 mV and/or $S_1$ lower than 1 mV/(μT·mm$^2$).

Also as a comparative example, an Ni—Zn-based ferrite core having composition of Patent Document 8 (composition including 48.0 to 50.0 mol % of $Fe_2O_3$, 14.0 to 24.0 mol % of NiO and 28.0 to 36.0 mol % of ZnO) was made as described below. As the starting material, powders of $Fe_2O_3$, ZnO and NiO each having a specific surface area in a range from 1 to 2 m$^2$/g were crushed and mixed in a vibration mill. Resultant powder was calcined at 1000° C. for two hours, and the calcined powder was mixed with pure water and crushed in wet process by a ball mill. The calcined powder after crushing had specific surface area of 1 to 2 m$^2$/g. A binder was added to the crushed powder and was granulated by spray drying method similarly to the example. The granulated material was molded into a green body of predetermined shape by press molding with a molding die. The green body was heated so as to raise the temperature from 750 to 1050° C. at the rate of 300° C./hour and maintained at 1150° C. for three hours. In the material thus fired, mean crystal grain size Z was from 3 to 30 μm, and proportion of the crystal grains having sizes in a range from 0.5Z to 3Z was 50% or less of the total number of crystal grains. This sample showed such drawbacks as magnetic permeability lower than 200 and difference between highest and lowest values of magnetic permeability larger than 20 despite the same composition.

TABLE 3

| | Ferrite core | | | | | | | | | | |
|---|---|---|---|---|---|---|---|---|---|---|---|
| Sample No. | D μm | Full width at half maximum ° | 0.5 D~ 3 D % | ΔD μm | Distribution of Zr % | Thickness of grain boundary phase nm | Curie temperature ° C. | Mean magnetic permeability | Δμ | Relative temperature coefficient 1/° C. | Density g/cm$^3$ |
| 1 | 5 | 0.31 | 60 | 0 | — | — | 207 | 312 | 3 | 0 | 5.29 |
| 2 | 8 | 0.25 | 100 | 1 | — | — | 138 | 670 | 2 | 1 × 10$^{-6}$ | 5.26 |
| 3 | 15 | 0.22 | 73 | 3 | — | — | 120 | 991 | 4 | 2 × 10$^{-6}$ | 5.25 |
| 4 | 12 | 0.2 | 85 | 2 | — | — | 124 | 881 | 2 | 2 × 10$^{-6}$ | 5.28 |
| 5 | 7 | 0.4 | 99 | 1 | — | — | 158 | 521 | 3 | 1 × 10$^{-6}$ | 5.28 |
| 6 | 6 | 0.3 | 100 | 0 | — | — | 276 | 221 | 4 | −1 × 10$^{-6}$ | 5.28 |
| 7 | 7 | 0.23 | 100 | 1 | 80 | 1 | 151 | 406 | 1 | 0 | 5.27 |
| 8 | 11 | 0.2 | 95 | 2 | 90 | 4 | 162 | 533 | 4 | 0 | 5.29 |
| 9 | 14 | 0.21 | 95 | 2 | 90 | 8 | 151 | 550 | 4 | 0 | 5.31 |
| 10 | 3 | 0.22 | 98 | 0 | 95 | 6 | 160 | 420 | 3 | −1 × 10$^{-6}$ | 5.32 |
| 11 | 6 | 0.23 | 100 | 0 | — | — | 145 | 401 | 3 | 0 | 5.26 |
| 12 | 10 | 0.25 | 100 | 0 | — | — | 142 | 411 | 3 | 3 × 10$^{-6}$ | 5.24 |
| *13 | 1.5 | 0.41 | 65 | 0 | — | — | 110 | 672 | 59 | 4 × 10$^{-6}$ | 5.22 |
| *14 | 18 | 0.43 | 55 | 6 | — | — | 116 | 727 | 80 | 0 | 5.31 |
| *15 | 5 | 0.45 | 90 | 1 | — | — | 284 | 170 | 22 | 0 | 5.3 |
| *16 | 12 | 0.34 | 100 | 5 | 40 | 30 | 104 | 879 | 90 | 7 × 10$^{-6}$ | 4.99 |
| *17 | 13 | 0.36 | 95 | 4 | 60 | 25 | 100 | 922 | 290 | 9 × 10$^{-6}$ | 5.25 |
| *18 | 6 | 0.39 | 100 | 2 | — | — | ≧300 | 56 | 20 | 32 × 10$^{-6}$ | 5.29 |
| *19 | 6 | 0.44 | 100 | 2 | — | — | 281 | 168 | 24 | 0 | 5.23 |
| *20 | 17 | 0.43 | 80 | 5 | — | — | 113 | 708 | 163 | 6 × 10$^{-6}$ | 5.29 |

Sample numbers marked with * are not within the scope of the present invention.

TABLE 4

| | Ferrite core | | | | | Ferrite coil | |
|---|---|---|---|---|---|---|---|
| Sample No. | Strength (3-point bending test) MPa | Changes in inductance % | Surface resistivity MΩ | Fracture toughness MPa·m$^{1/2}$ | Core loss kW/m$^3$ | Induced electromotive force mV | $S_1$ mV/(μT·mm$^2$) |
| 1 | 165 | −3 | 2000 | 0.9 | 230 | 22.4 | 1.2 |
| 2 | 153 | −4 | 2000 | 1 | 210 | 28.2 | 2.7 |
| 3 | 143 | −8 | 2000 | 1.1 | 220 | 44.2 | 3.4 |
| 4 | 147 | −7 | 2000 | 0.8 | 180 | 53.2 | 3.1 |
| 5 | 156 | −5 | 2000 | 1.2 | 210 | 25.8 | 2.5 |
| 6 | 145 | −2 | 2000 | 1 | 170 | 40.3 | 2.8 |
| 7 | 170 | −3 | 2000 | 0.9 | 170 | 42.6 | 3.1 |
| 8 | 172 | −3 | 2000 | 1.3 | 160 | 45.8 | 2.5 |
| 9 | 173 | −3 | 2000 | 1 | 160 | 49.6 | 2.9 |
| 10 | 184 | −3 | 2000 | 1 | 180 | 43.5 | 2.2 |
| 11 | 168 | −4 | 2000 | 1.1 | 170 | 42.3 | 2.1 |
| 12 | 152 | −3 | 2000 | 1.2 | 170 | 42.9 | 2.2 |
| *13 | 133 | −6 | 2000 | 0.7 | 320 | 15.8 | 0.4 |
| *14 | 135 | −5 | 50 | 0.7 | 340 | 16.6 | 0.5 |
| *15 | 172 | −4 | 2000 | 1 | 330 | 18.9 | 0.3 |
| *16 | 143 | −11 | 50 | 0.7 | 350 | 18.0 | 0.6 |
| *17 | 141 | −12 | 2000 | 0.7 | 400 | 13.5 | 0.5 |
| *18 | 144 | −2 | 2000 | 0.9 | 450 | 14.9 | 0.4 |
| *19 | 154 | −4 | 50 | 0.9 | 360 | 13.0 | 0.3 |
| *20 | 136 | −6 | 2000 | 0.7 | 420 | 14.4 | 0.4 |

Sample numbers marked with * are not within the scope of the present invention.

What is claimed is:

1. The A ferrite core for RFID application comprising a sintered oxide containing at least 48.6 to 53.9 mol % of Fe on $Fe_2O_3$ basis, 12.3 to 35.2 mol % of Ni on NiO basis and 16.4 to 37.0 mol % of Zn on ZnO basis as metal elements, and contains a crystal phase comprising two or more kinds of solid solutions selected from $NiFe_2O_4$, $ZnFe_2O_4$ and $FeFe_2O_4$, wherein full width at half maximum of a diffraction peak, of said crystal phase of which diffraction angle 2θ is in a range from 34.6 to 36.4° as measured by X-ray diffraction analysis using Cu—Kα beam, is 0.4 or less, wherein 9 parts by weight or less of Cu on CuO basis is contained for 100 parts by weight of said sintered oxide, wherein 0.001 to 0.6 parts by weight of Zr on $ZrO_2$ basis is contained for 100 parts by weight of said sintered oxide, Zr is uniformly distributed in said sintered oxide and thickness of the grain boundary phase in said sintered oxide is 20 nm or less.

2. The ferrite core for RFID application according to claim 1, wherein the mean crystal grain size D is in a range from 2 to 15 μm and the number of crystal grains having sizes in a range from 0.5D to 3D is 60% or more of the total number of crystal grains.

3. The ferrite core for RFID application according to claim 1, wherein the difference between the mean crystal grain size in the surface and the mean crystal grain size in the inside is 10 μm or less.

4. The ferrite core for RFID application according to claim 1, wherein the magnetic permeability is 400 or higher.

5. The ferrite core for RFID application according to claim 1, wherein the relative temperature coefficient of the magnetic permeability over a range from −50 to 150° C. is from $-2\times10^{-6}$ to $2\times10^{31\ 6}$/° C.

6. The ferrite core for RFID application according to claim 1, wherein the density is 5.0 g/cm$^3$ or higher.

7. The ferrite core for RFID application according to claim 1, wherein the strength is 140 MPa or higher as measured by 3-point bending test.

8. The ferrite core for RFID application according to claim 1, wherein changes in inductance under compressive pressure of 50 MPa per 1 mm$^2$ are within ±10%.

9. The ferrite core for RFID application according to claim 1, wherein the fracture toughness measured by IF method is 0.8 MPa·m$^{1/2}$ or higher.

10. A method of manufacturing the ferrite core for RFID application of claim 4 which comprises
   a primary crushing step of making a primary crushed powder having a specific surface area exceeding 5 m$^2$/g by mixing and crushing a powder containing at least a powder of Fe oxide, a powder of Ni oxide, a powder of Zn oxide, a powder of Cu oxide and a powder of Zr oxide, and containing 48.6 to 53.9 mol % of $Fe_2O_3$ oxide on $Fe_2O_3$ basis, 12.3 to 35.2 mol % of Ni oxide on NiO basis, and 16.4 to 37.0 mol % of Zn oxide on ZnO, 9 parts by weight of less of Cu on CuO basis and 0.001 to 0.6 parts by weight of $ZrO_2$ basis, and at least one of Fe oxide, Ni oxide, Zn oxide, Cu oxide and Zr oxide has specific surface area exceeding 5 m$^2$/g;
   a calcination step of calcinating said primary crushed powder so as to make a calcined powder;
   a secondary crushing step of crushing said calcined powder to make a secondary crushed powder having a specific surface area exceeding 5 m$^2$/g;
   a forming step of forming a green body by mixing said secondary crushed powder and an organic binder, granulating the mixture and molding the granulated material;
   a debinding step of removing the organic binder from said green body to make a debound green body having carbon content of 300 ppm or less; and
   a firing step of firing said debound green body in a firing furnace at a temperature from 1050 to 1300° C. to make the ferrite core for RFID application made of a sintered body.

11. A ferrite coil comprising a ferrite core for RFID application comprising a sintered oxide containing at least 48.6 to 53.9 mol % of Fe on $Fe_2O_3$ basis, 12.3 to 35.2 mol % of Ni on NiO basis and 16.4 to 37.0 mol % of Zn on ZnO basis as metal elements, and contains a crystal phase comprising two or more kinds of solid solutions selected from $NiFe_2O_4$, $ZnFe_2O_4$ and $FeFe_2O_4$, wherein full width at half maximum of a diffraction peak, of said crystal phase of which diffraction angle $2\theta$ is in a range from 34.6 to 36.4° as measured by X-ray diffraction analysis using Cu—K$\alpha$ beam, is 0.4 or less, wherein said ferrite core far RFID application contains 9 parts by weight or less of Cu on CuO basis for 100 parts by weight of said sintered oxide, wherein said ferrite core for RFID application contains 0.001 to 0.6 parts by weight of Zr on $ZrO_2$ basis for 100 parts by weight of said sintered oxide, Zr is uniformly distributed in said sintered oxide and thickness of the grain boundary phase in said sintered oxide is 20 nm or less.

12. The ferrite coil according to claim 1, wherein said ferrite core for RFID application has a mean crystal grain size D in a range from 2 to 15 μm and the number of crystal grains having sizes in a range from 0.5D to 3D is 60% or more of the total number of crystal grains.

13. The ferrite coil according to claim 11, wherein said ferrite core for RFID application has the difference between the mean crystal grain size in the surface thereof and the mean crystal grain size in the inside thereof being 10 μm or less.

14. The ferrite coil according to claim 11, wherein said ferrite core for RFID application has magnetic permeability of 400 or higher.

15. The ferrite coil according to claim 11, wherein said ferrite core for RFID application has a relative temperature coefficient of the magnetic permeability in a range from $-2\times10^{-6}$ to $2\times10^{-6}/°$ C./over a range from −50 to 150° C.

16. The ferrite coil according to claim 11, wherein said ferrite core for RFID application has the density of 5.0 gym$^3$ or higher.

17. The ferrite coil according to claim 11, wherein said ferrite core for RFID application has the strength of 140 MPa or higher as measured by a 3-point bending test.

18. The ferrite coil according to claim 11, wherein said ferrite core for RFID application has changes in inductance under compressive pressure of 50 MPa per 1 mm$^2$ within ±10%.

19. The ferrite coil according to claim 11, wherein said ferrite core for RFID application has fracture toughness measured by an IF method being 0.8 MPa·m$^{1/2}$ or higher.

* * * * *